(12) United States Patent
Netuschill

(10) Patent No.: US 11,320,790 B2
(45) Date of Patent: May 3, 2022

(54) METHOD FOR MARKING A SAPPHIRE WATCH CRYSTAL

(71) Applicant: Comadur SA, Le Locle (CH)

(72) Inventor: Alexandre Netuschill, Le Cerneux-Pequignot (CH)

(73) Assignee: Comadur SA, Le Locle (CH)

( * ) Notice: Subject to any disclaimer, the term of this patent is extended or adjusted under 35 U.S.C. 154(b) by 0 days.

(21) Appl. No.: 16/819,400

(22) Filed: Mar. 16, 2020

(65) Prior Publication Data

US 2020/0301367 A1 Sep. 24, 2020

(30) Foreign Application Priority Data

Mar. 19, 2019 (EP) ..................................... 19163887

(51) Int. Cl.
*G04B 39/00* (2006.01)
*B23K 26/362* (2014.01)
*B23K 26/402* (2014.01)

(52) U.S. Cl.
CPC .......... *G04B 39/006* (2013.01); *B23K 26/362* (2013.01); *B23K 26/402* (2013.01)

(58) Field of Classification Search
CPC combination set(s) only.
See application file for complete search history.

(56) References Cited

U.S. PATENT DOCUMENTS

| 2007/0076531 | A1 | 4/2007 | Schiavolini | |
|---|---|---|---|---|
| 2007/0266896 | A1* | 11/2007 | Suwa | G02B 1/14 106/287.16 |
| 2015/0050468 | A1* | 2/2015 | Reichenbach | B23K 26/082 428/195.1 |

FOREIGN PATENT DOCUMENTS

| CN | 1284916 A | 2/2001 |
|---|---|---|
| CN | 1401507 A | 3/2003 |
| CN | 101152819 A | 4/2008 |
| CN | 104339081 A | 2/2015 |
| CN | 104339088 A | 2/2015 |
| CN | 105451927 A | 3/2016 |
| CN | 105974767 A | 9/2016 |

(Continued)

OTHER PUBLICATIONS

Machine translation of JP2006-248044 (Year: 2006).*

(Continued)

*Primary Examiner* — Erin F Bergner

(74) *Attorney, Agent, or Firm* — Oblon, McClelland, Maier & Neustadt, L.L.P.

(57) ABSTRACT

A method for marking a sapphire watch crystal, through the interaction between a laser beam and the sapphire. The beam is focused on a point inside the crystal and the interaction is such that it produces a rectilinear opaque area, which is parallel to the upper surface of the crystal or perpendicular to the surface. The orientation of the opaque area depends on the mode of operation applied. According to the hatching mode of operation, the beam is scanned along one or more linear paths, producing opaque lines inside the crystal, which are parallel to the upper surface. The perforation mode of operation produces distinct opaque areas, obtained by discontinuous operation of the beam on a number of juxtaposed points. According to this latter mode of operation, the opaque areas extend in the direction perpendicular to the upper surface of the crystal.

11 Claims, 3 Drawing Sheets

(56) References Cited

FOREIGN PATENT DOCUMENTS

| | | | |
|---|---|---|---|
| CN | 106030617 A | 10/2016 |
| CN | 106103374 A | 11/2016 |
| CN | 106378532 A | 2/2017 |
| JP | 11-267861 A | 10/1999 |
| JP | 2006-248044 A | 9/2006 |
| JP | 2008-87054 A | 4/2008 |
| KR | 10-2010-0120297 A | 11/2010 |
| KR | 10-2015-0033778 A | 4/2015 |
| TW | M430873 U1 | 6/2012 |
| WO | WO 99/21061 A1 | 4/1999 |
| WO | WO 2005/047989 A2 | 5/2005 |
| WO | WO 2008/025919 A2 | 3/2008 |
| WO | WO 2009/114375 A2 | 9/2009 |

OTHER PUBLICATIONS

European Search Report dated Sep. 17, 2019 in European Application 19163887.3 filed Mar. 19, 2019 (with English Translation of Categories of Cited Documents), 3 pages.
Japanese Office Action dated Mar. 9, 2021 in Japanese Patent Application No. 2020-036449 (with English translation), 5 pages.
Korean Office Action dated Feb. 19, 2021 in Korean Patent Application No. 10-2020-0030854 (with English translation), 12 pages.
Combined Chinese Office Action and Search Report dated Jul. 28, 2021 in Patent Application No. 202010169871.1 (with English translation of Category of Cited Documents), 18 pages.
Chinese Office Action issued in Chinese Patent Application No. 202010169871.1 dated Feb. 7, 2022 (w/ English translation).

* cited by examiner

METHOD FOR MARKING A SAPPHIRE WATCH CRYSTAL

CROSS-REFERENCE TO RELATED APPLICATION

This application claims priority to European Patent Application No. 19163887.3 filed on Mar. 19, 2019, the entire disclosure of which is hereby incorporated herein by reference.

FIELD OF THE INVENTION

The present invention relates to horology, in particular to the marking of a watch crystal, to add to the crystal a serial number, picture or logo, or any other type of information and/or aesthetic mark. The invention is more particularly focused on the marking of a sapphire watch crystal.

STATE OF THE ART

A known technique for obtaining a marking consists in etching the crystal using a laser. On sapphire crystals, it is known to use a laser that is focused on the upper surface of the crystal and to scan the laser over part of the surface, in order to remove material, thereby creating a break in the crystal lattice and making the material opaque. The material removed must be evacuated in the form of dust, which represents a drawback of this approach, since dust is likely to contaminate the marking.

Another technique for marking watch crystals made of sapphire or other materials consists in etching the material with a laser focused inside the crystal, but in dotted lines. Patent Application No. WO9921061A1 discloses such a technique, which consist in creating a series of laser impact points juxtaposed within the material, in order to form a pattern. The etching conditions are such that the impact produces a star-shaped internal defect, whose cross-section cannot be controlled. This imposes a limit on the minimum distance between two consecutive impact areas, thereby limiting the visibility of certain markings or pictures.

SUMMARY OF THE INVENTION

It is an object of the present invention to provide methods for producing markings in a sapphire watch crystal which do not suffer from the drawbacks identified above. This object is achieved by a method and by a crystal and a watch according to the annexed claims.

The invention concerns a method for marking a sapphire watch crystal, through the interaction between a laser beam and the sapphire. The beam is focused on a point inside the crystal and the interaction is such that it produces a rectilinear opaque area, which is parallel to the upper surface of the crystal or perpendicular to said surface. The orientation of the opaque area depends on the mode of operation applied. According to the hatching mode of operation, the beam is scanned along one or more linear paths, producing opaque lines inside the crystal, which are parallel to the upper surface. The perforation mode of operation produces distinct opaque areas, obtained by discontinuous operation of the beam on a number of juxtaposed points. According to this latter mode of operation, the opaque areas extend in the direction perpendicular to the upper surface of the crystal.

Other features and advantages of the present invention will appear in the following description of preferred embodiments, given by way of non-limiting example, with reference to the annexed drawings. A number of ranges of parameter values are identified in the detailed description and in the claims. The ranges are inclusive of the end values.

DETAILED DESCRIPTION OF EMBODIMENTS OF THE INVENTION

Figure 1:
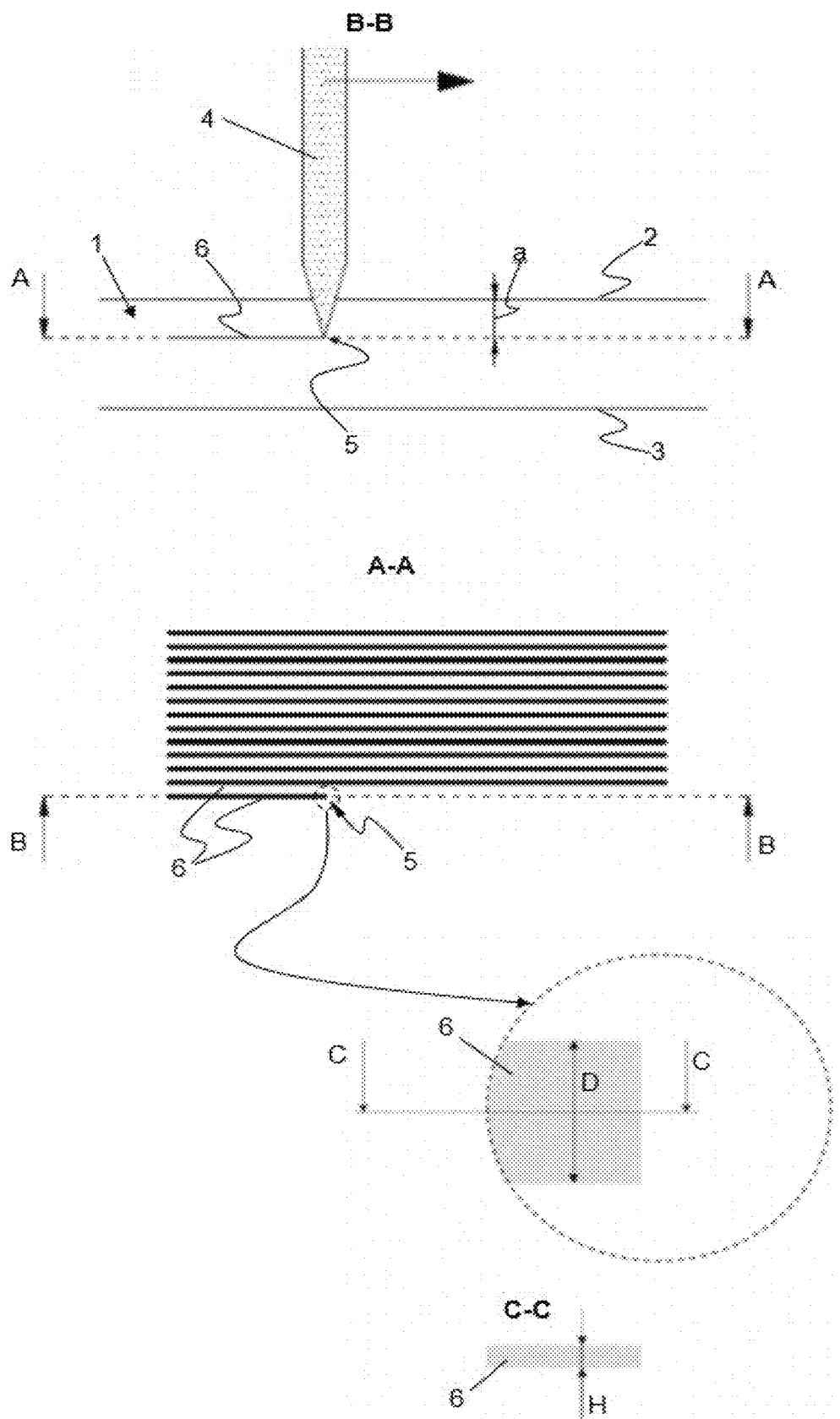
FIG. 1 represents two cuts in a sapphire crystal according to the invention, during the marking of the crystal in a first mode of operation, called the hatching mode, in addition to a specific detail.
Figure 3:
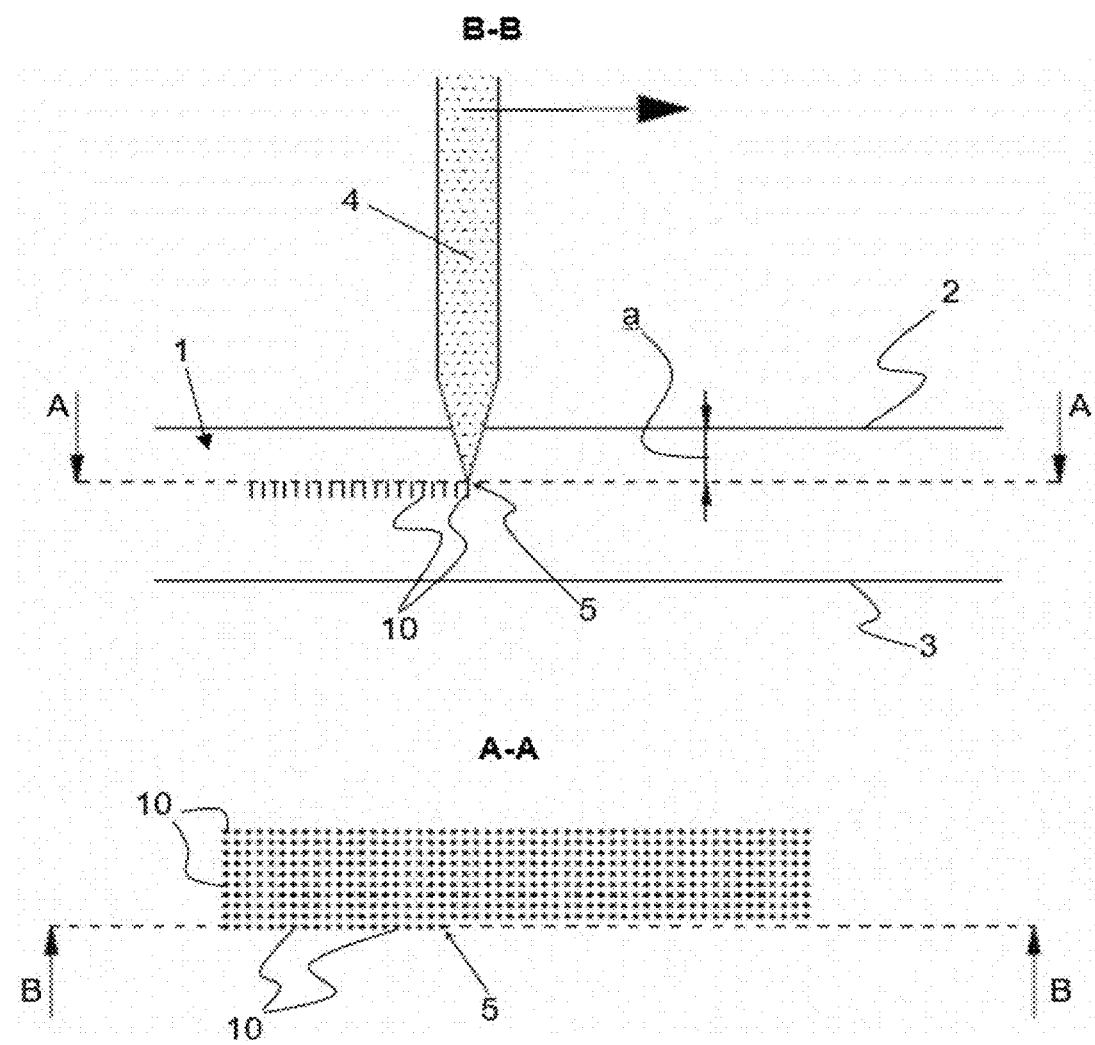
FIG. 3 represents two cuts in a sapphire crystal according to the invention, during the marking of the crystal in a second mode of operation, called the perforation mode.

In both modes of operation of the invention, respectively illustrated in FIGS. 1 and 3, a transparent sapphire watch crystal 1 is marked by a laser beam 4 oriented perpendicularly to upper surface 2 and focused on a point 5 inside the crystal.

In the non-limiting examples represented, crystal 1 has an upper surface 2 and a lower surface 3, which are essentially plane and parallel with respect to one another. According to the first mode of operation (FIG. 1), beam 4 is scanned over part of the surface of crystal 1, following a number of juxtaposed linear paths, thus producing a hatched marking. The distance 'a' between the laser focal point 5 and upper surface 2 remains essentially fixed during the scanning phase. The parameters applied for hatching are such that each scan along a linear path will produce an opaque area 6 inside the sapphire, the area being essentially rectilinear and perpendicular to the direction of the beam (or parallel to the upper surface of the crystal). The detail in FIG. 1 shows that opaque area 6 is characterized by its width D and height H.

According to a preferred embodiment, these dimensions can be controlled as a function of the power of the laser and the design to be etched. The order of magnitude of height H ranges from one micrometre to several hundreds of micrometres, for example up to 200 micrometres. Without being bound by theory, it is estimated that each opaque area is formed of a plurality of microfissures which extend in the direction of the scanning path.

The main parameter that makes it possible to obtain rectilinear areas 6 parallel to upper surface 2 of the crystal is the scanning speed. This speed is considerably higher than the speeds used for material removal etching of a sapphire crystal.

Preferably, the scanning speed according to the invention is between 2 m/s and 3 m/s, for example 2.5 m/s. Further, it is necessary for the laser to operate at a speed suitable for etching a watch crystal. Table 1a gives the preferred values for the laser operating parameters used in the first operating mode:

TABLE 1a

| Type of laser | Pulse laser |
|---|---|
| Pulse length | 200 fs-10 ps |
| Wavelength | 500 nm-1200 nm |

TABLE 1a-continued

| | |
|---|---|
| Pulse frequency | 200 kHz-1.5 MHz |
| Laser energy | 1 µJ-20 µJ |

Table 1a gives preferred values for a number of geometric parameters used in the first operating mode:

TABLE 1b

| | |
|---|---|
| Distance between two adjacent opaque areas 6 (measured between the central lines of areas 6) | 10 µm-20 µm |
| Depth of laser focal point 5 (distance 'a' in FIG. 1). | 0.5 mm-1 mm |

Figure 2:
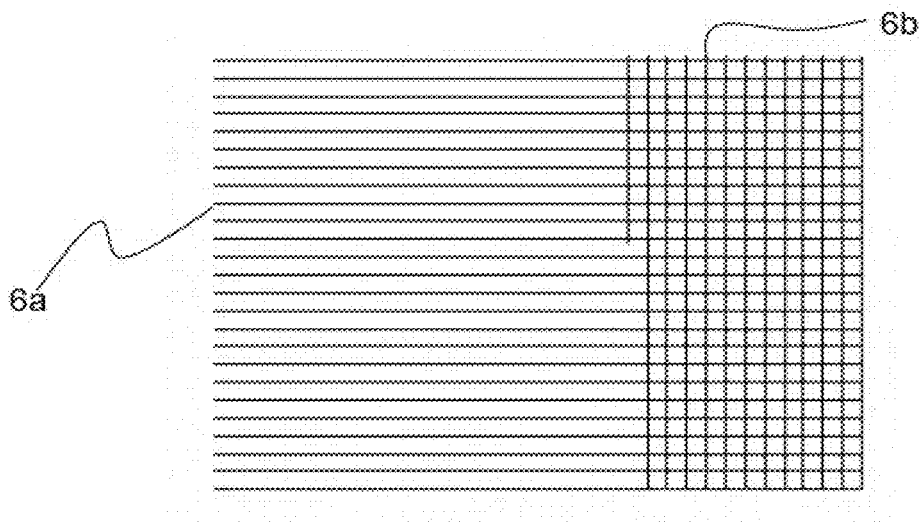
FIG. 2 represents marking according to the first mode of operation, wherein two hatching steps are carried out in a crossed manner.

According to a specific embodiment of the first operating mode, a second hatching step is performed in a transverse direction to the direction of the first step. FIG. 2 represents the partial result of two crossed hatching steps wherein the two series of opaque lines 6a and 6b formed by the respective steps are perpendicular to one another. The second hatching step is performed with laser focal point 5 located at the same depth 'a' as in the first step. Preferably, the distance between two adjacent lines 6a or 6b is equal in both steps. The angle between the direction of lines 6a and 6b is preferably between 30° and 90°.

The hatching operating mode can be used to create a three-dimensional shape, by performing the hatching at several levels in the material. This method starts with a first hatching step (single or crossed), focusing the laser at a distance $a_1$ from upper surface 2, followed by one or more consecutive steps, at distances $a_2$, $a_3$, . . . which are progressively less than initial distance $a_1$. In this manner, a 3D shape which has several layers is obtained. The distance between two layers is selected to avoid partial superposition of two adjacent layers.

According to a second operating mode, illustrated in FIG. 3, a laser beam 4 is focused consecutively and each time for a defined on time, on a series of juxtaposed points 5 located inside a sapphire watch crystal 1, at a fixed distance 'a' from upper surface 2 of the crystal. This method, called the 'perforation mode of operation', is thus similar to the method disclosed in WO Patent Application 99/21061A1. However, the parameters of the method are configured such that the defects produced by the impact of the laser are different with respect to prior methods.

Figure 4:
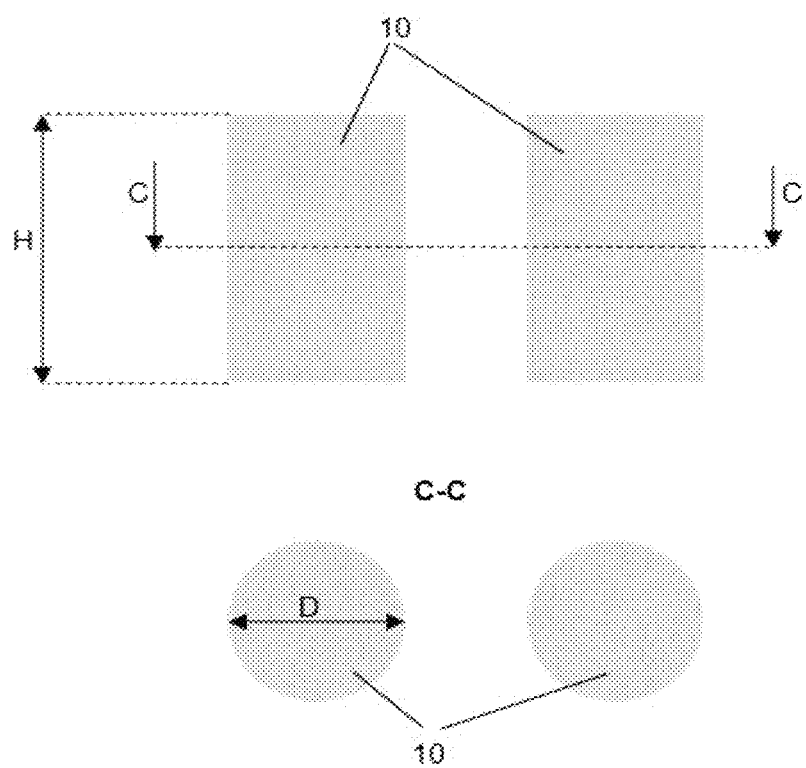
FIG. 4 represents a detail of the sapphire crystal, marked according to the perforation marking mode.

According to the method of the invention, the interaction between the laser and the sapphire produces a rectilinear opaque area 10, which extends in the direction of the beam, i.e. perpendicularly to upper surface 2 of crystal 1. As represented in the detail of FIG. 4, each area 10 is defined by its diameter D and its height H. These dimensions can be controlled as a function of the power of the laser and the laser on time used for each point. Diameter D is preferably on the order of magnitude of the micrometre, for example between 1 and 30 micrometres. Height H may, for example, be between 1 and several hundred micrometres. As in the first operating mode, and without being bound by theory, it is estimated that each area 10 is formed of a plurality of microfissures which extend in the direction of laser beam 4. Unlike the star-shaped defects described in WO 99/21061A1, areas 10 represent a shape clearly defined by dimensions D and H, which can, moreover, be controlled by the laser parameters. This allows for more efficient control of the distance between two points of impact and of the thickness of a marking.

Table 2a sets out the laser parameters that can preferably be used to achieve a marking according to this second mode of operation.

TABLE 2a

| | |
|---|---|
| Type of laser | Pulse laser |
| Pulse length | 200 fs-10 ps |
| Wavelength | 500 nm-1200 nm |
| Pulse frequency | 200 kHz-1.5 MHz |
| Laser energy | 1 µJ-20 µJ |
| Laser on time | 0.01 ms-0.1 ms |

Table 2b gives preferred values for a number of geometric parameters used in the second mode of operation:

TABLE 2b

| | |
|---|---|
| Distance between two adjacent areas 10 (measured between the centres of two areas) | 0.01 mm-0.03 mm |
| Depth of laser focal point (distance 'a' in FIG. 3). | 0.5 mm-1 mm |

In a similar manner to the first mode of operation, a three-dimensional marking can be obtained by perforation marking at several levels in the thickness of crystal 1. This method starts with a first perforation step, focusing the laser at a distance $a_1$ from upper surface 2, followed by one or more consecutive steps, at distances $a_2$, $a_3$, . . . which are progressively less than initial distance $a_1$. In this manner, a 3D shape which is formed of several layers is obtained. The distance between two layers is selected to avoid partial superposition of two adjacent layers.

The method according to the invention also functions when an anti-reflective layer, for example, a layer of $MgF_2$ or $SiO_2$ is present on upper surface 2 of the crystal.

The invention also concerns a sapphire watch crystal marked by any of the methods described above, and a watch provided with said crystal.

The invention claimed is:

1. A method for marking a sapphire watch crystal, the crystal having a plane upper surface and a lower surface, the method comprising:
   using a laser beam directed perpendicularly to the upper surface;
   focusing the laser beam at a point inside the material of the crystal, wherein an interaction between the laser and the sapphire at the focal point produces a rectilinear opaque area which extends along a path in a direction parallel to the upper surface or in a direction perpendicular to said upper surface;
   forming a plurality of parallel rectilinear opaque paths with the laser beam which extend in the direction parallel to the upper surface or in the direction perpendicular to said upper surface, in order to mark a first portion of the crystal in a first hatching step,
   wherein the laser beam is scanned at a scanning speed between 2 m/s and 3 m/s, and
   wherein a distance between each of the plurality of parallel rectilinear opaque paths is 10 µm to 20 µm.

2. The method according to claim 1, wherein the laser beam is scanned along a linear path while remaining focused on a point at a fixed distance with respect to the upper surface of the crystal, and
   wherein said plurality of parallel rectilinear opaque paths are essentially parallel to the upper surface of the crystal.

3. The method according to claim 1, wherein a second hatching step is performed in a transverse direction with respect to the first step, the second step being performed on a second portion of the crystal, which at least partially covers the first portion, the second hatching step being performed at the same distance respect to the upper surface as the first hatching step.

4. The method according to claim 1, wherein several hatching operations, comprising one or two steps, are performed at successive levels in the material, in order to obtain a three-dimensional marking, and wherein the rectilinear opaque areas formed at two adjacent levels are separate from each other.

5. The method according to claim 2, wherein parameters of the laser beam are as follows:

| Type of laser | Pulse laser |
| --- | --- |
| Pulse length | 200 fs-10 ps |
| Wavelength | 500 nm-1200 nm |
| Pulse frequency | 200 kHz-1.5 MHz |
| Laser energy | 1 µJ-20 µJ. |

6. The method according to claim 2, wherein geometric parameters are defined as follows:

| Depth of the laser focal point | 0.5 mm-1 mm. |
| --- | --- |

7. The method according to claim 1, wherein the laser beam is focused consecutively on a plurality of juxtaposed points located at the same distance from the upper surface, and wherein the rectilinear opaque paths are produced at each of the points, said areas extending in the direction perpendicular to the upper surface.

8. The method according to claim 7, wherein several marking steps are performed at successive levels in the material, in order to obtain a three-dimensional marking, and wherein the rectilinear opaque areas formed on two adjacent levels are separate from each other.

9. The method according to claim 7, wherein values of laser parameters are as follows:

| Type of laser | Pulse laser |
| --- | --- |
| Pulse length | 200 fs-10 ps |
| Wavelength | 500 nm-1200 nm |
| Pulse frequency | 200 kHz-1.5 MHz |
| Laser energy | 1 µJ-20 µJ |
| Laser on time | 0.01 ms-0.1 ms. |

10. The method according to claim 7, wherein values of geometric parameters are defined as follows:

| Distance between two adjacent points | 0.01 mm-0.03 mm |
| --- | --- |
| Depth of the laser focal point | 0.5 mm-1 mm. |

11. The method according to claim 1, wherein the upper surface of the crystal is provided with an anti-reflective layer.

* * * * *